United States Patent
Wang et al.

(10) Patent No.: US 11,680,014 B2
(45) Date of Patent: Jun. 20, 2023

(54) MAGNESIUM-BASED CEMENTITIOUS MATERIAL, PREPARATION METHOD AND APPLICATION THEREOF

(71) Applicant: Wuhan University of Technology, Wuhan (CN)

(72) Inventors: Fazhou Wang, Wuhan (CN); Zhichao Liu, Wuhan (CN); Shuguang Hu, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 17/941,047

(22) Filed: Sep. 9, 2022

(65) Prior Publication Data

US 2023/0159389 A1 May 25, 2023

(30) Foreign Application Priority Data

Nov. 19, 2021 (CN) .......................... 202111376044.0

(51) Int. Cl.
*C04B 28/10* (2006.01)
*C04B 28/30* (2006.01)
(Continued)

(52) U.S. Cl.
CPC .................. *C04B 9/11* (2013.01); *C04B 9/20* (2013.01); *C04B 2111/00068* (2013.01); *C04B 2111/00215* (2013.01)

(58) Field of Classification Search
CPC ... C04B 9/11; C04B 9/20; C04B 2111/00068; C04B 2111/00215; C04B 28/10; C04B 28/30; C04B 9/00
See application file for complete search history.

(56) References Cited

U.S. PATENT DOCUMENTS

2012/0312194 A1* 12/2012 Riman .................... C04B 28/10
106/796

FOREIGN PATENT DOCUMENTS

| CN | 102976641 A | * | 3/2013 | |
| CN | 112939494 A | * | 6/2021 | ............... C04B 9/06 |
| CN | 112939494 A |   | 6/2021 | |

OTHER PUBLICATIONS

CN-112939494-A Diao, machine translation (Year: 2021).*
(Continued)

*Primary Examiner* — Kevin E Yoon
*Assistant Examiner* — Marites A Guino-O Uzzle
(74) *Attorney, Agent, or Firm* — Zhigang Ma

(57) ABSTRACT

Disclosed is a magnesium-based cementitious material, preparation method and application thereof. The magnesium-based cementitious material, comprising magnesite, sandstone, and water, wherein: the magnesite is provided with CaO, $SiO_2$, $Al_2O_3$, $Fe_2O_3$, and MgO, a mass percentage of the CaO is less than 5%, a mass percentage of $SiO_2$ is less than 5%, a mass percentage of $Al_2O_3$ is less than 5%, a mass percentage of $Fe_2O_3$ is less than 7%, a mass percentage of MgO is between 37% and 50%; the sandstone is provided with $SiO_2$, CaO, $Al_2O_3$, and $Fe_2O_3$, a mass percentage of $SiO_2$ is greater than 70%. The beneficial effects of this disclosure are: the cementitious material does not contain $MgCl_2$, which avoids the reduction of the strength of the cementitious material due to the dissolution of $MgCl_2$ in water; the magnesium-based cementitious material of this disclosure is immiscible with water and has strong water resistance.

7 Claims, 3 Drawing Sheets

(51) Int. Cl.
    *C04B 9/00*           (2006.01)
    *C04B 9/20*           (2006.01)
    *C04B 9/11*           (2006.01)
    *C04B 111/00*       (2006.01)

(56) References Cited

OTHER PUBLICATIONS

CN-102976641-A Chen, machine translation (Year: 2013).*
CNIPA, Notification of a First Office Action for CN202111376044.0, dated Mar. 29, 2022.
Wuhan University of Technology (Applicant), Reply to Notification of a First Office Action for CN202111376044.0, w/(allowed) replacement claims, May 26, 2022.
CNIPA, Notification to grant patent right for invention in CN202111376044.0, dated Jun. 10, 2022.

* cited by examiner

MAGNESIUM-BASED CEMENTITIOUS MATERIAL, PREPARATION METHOD AND APPLICATION THEREOF

FIELD OF THE DISCLOSURE

The disclosure relates to the technical field of cement chemical industry, in particular to a magnesium-based cementitious material, preparation method and application thereof.

BACKGROUND

Magnesium cementitious material is a magnesium-based cementitious material with excellent properties (such as thermal insulation, fire and moisture resistance, light weight and shock resistance, high strength and durability, and non-toxic and non-emission). Based on its excellent properties, magnesium cementitious materials are widely used as building materials.

At present, the magnesium cementitious material in the related art is mainly magnesium oxychloride cement, which is obtained by the following process: calcining magnesite to obtain magnesium oxide (MgO), then mixing the obtained magnesium oxide (MgO) with magnesium chloride ($MgCl_2$) and water ($H_2O$), and the obtained mixture is stirred, shaped, maintained to obtain the magnesium oxychloride cement. However, the prepared magnesium oxychloride cement has poor water resistance due to the presence of internal magnesium chloride, and gradually loses its strength in water, and the strength loss rate can reach 60%-80%. Furthermore, because the $MgCl_2$ component of magnesium oxychloride cement contains chloride ions, chloride ions are highly corrosive to Fe, Al, and other metals, which severely limits the application of magnesium-based cementitious materials.

SUMMARY

The purpose of this disclosure is to provide a magnesium-based cementitious material, preparation method and application thereof. The magnesium-based cementitious material provided by this disclosure has good water resistance, does not contain chloride ions in the composition, hence it is not corrosive to metals such as Fe and Al.

To solve the above questions, this disclosure provides a magnesium-based cementitious material, comprising comprising magnesite, sandstone, and water, wherein: the magnesite is provided with CaO, $SiO_2$, $Al_2O_3$, $Fe_2O_3$, and MgO, a mass percentage of the CaO is less than 5%, a mass percentage of $SiO_2$ is less than 5%, a mass percentage of $Al_2O_3$ is less than 5%, a mass percentage of $Fe_2O_3$ is less than 7%, a mass percentage of MgO is between 37% and 50%;

the sandstone is provided with $SiO_2$, CaO, $Al_2O_3$, and $Fe_2O_3$, a mass percentage of $SiO_2$ is greater than 70%, a mass percentage of CaO is less than 10%, a mass percentage of $Al_2O_3$ is less than 10%, and a mass percentage of $Fe_2O_3$ is less than 5%;

a mass ratio of the magnesite to the sandstone is 65-75: 25-35.

This disclosure also provides a preparation method for the magnesium-based cementitious material, comprising the following steps:

Mixing the magnesite and sandstone to obtain a mixture, and processing the mixture by molding to obtain a molded raw meal;

Calcining the molded raw meal to obtain a clinker;

Mixing and shaping the clinker with water to obtain a primary cementitious material;

Subjecting the primary cementitious material to carbonization curing to obtain the magnesium-based cementitious material.

This disclosure also provides an application of the magnesium-based cementitious material in building materials.

Compared with the prior art, the beneficial effects of this disclosure are: the magnesium-based cementitious material of this disclosure uses magnesite and sandstone as the main preparation raw materials, and obtains a cementitious material mainly composed of magnesium carbonate, magnesium silicate, and magnesium hydroxide composite crystal. The cementitious material does not contain $MgCl_2$, which avoids the reduction of the strength of the cementitious material due to the dissolution of $MgCl_2$ in water; the magnesium-based cementitious material of this disclosure is immiscible with water and has strong water resistance. At the same time, the corrosion of Fe and Al metal caused by the presence of magnesium chloride in the magnesium-based cementitious material is avoided.

The data of embodiments show that the compressive strength of the cementitious material provided by this disclosure decreased by only about 15% after being immersed in water for 7 days. And the magnesium-based cementitious material prepared by this disclosure is far less corrosive to aluminum than the cementitious material in Comparative Embodiment 1.

The preparation method of the magnesium-based cementitious material provided by this disclosure uses magnesium and sandstone that do not contain $MgCl_2$ as the preparation raw materials, and the prepared raw materials are then calcined, mixed with water, and molded to obtain a primary cementitious material; the primary cementitious material is then carbonized and cured to obtain a cementitious phase dominated by composite crystals of magnesium carbonate, magnesium silicate, and magnesium hydroxide. Compared with the way of water curing magnesium oxychloride cement into a cementitious state in the prior art, the water resistance of the magnesium-based cementitious material is improved. Meanwhile, the preparation method of this disclosure also does not introduce chloride ions, which ensures corrosion resistance.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Figure 1:
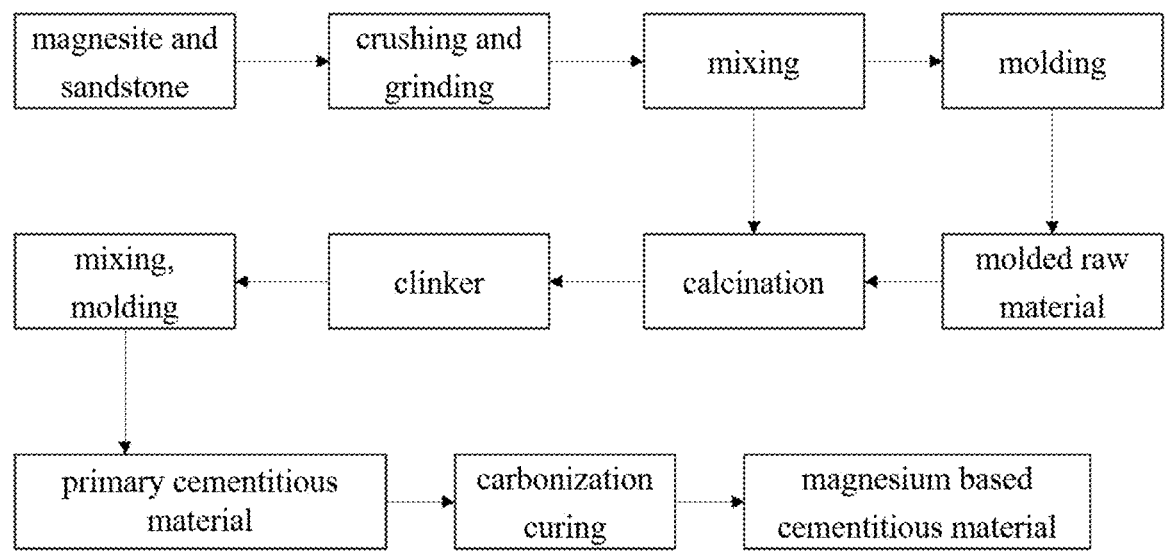
FIG. 1 is a diagram of the preparation process of magnet-based cementitious material in this disclosure.

This disclosure provides a magnesium-based cementitious material, comprising the following raw materials: magnesite, sandstone, and water;

In this disclosure, in the magnesite: the mass percentage of CaO is less than 5%, the mass percentage of $SiO_2$ is less than 5%, the mass percentage of $Al_2O_3$ is less than 5%, the mass percentage of $Fe_2O_3$ is less than 7%, the mass percentage of MgO is between 37% and 50%. Preferably, in the magnesite, the mass percentage of CaO is 0.89%, the mass percentage of $SiO_2$ is 1.23%, the mass percentage of $Al_2O_3$ is 2.880%, the mass percentage of $Fe_2O_3$ is 5.75%, and the mass of MgO is 43.025%.

In this disclosure, the magnesite preferably comprises other components whose loss on ignition at 900° C. is 40%-60% by mass, specifically water, carbon dioxide, and other gaseous components that can be lost at 900° C.

In this disclosure, in the sandstone: a mass percentage of $SiO_2$ is greater than 70%, a mass percentage of CaO is less than 10%, a mass percentage of $Al_2O_3$ is less than 10%, and a mass percentage of $Fe_2O_3$ is less than 5%. Preferably, in the sandstone, a mass percentage of $SiO_2$ is 74.887%, a mass percentage of CaO is 5.366%, a mass percentage of $Al_2O_3$ is 8.142%, a mass percentage of $Fe_2O_3$ is 3.406%, and a mass percentage of MgO is 1.223%.

In this disclosure, the sandstone preferably comprises other components whose loss on ignition at 900° C. is 5-10% by mass, specifically water, carbon dioxide, and other gaseous components that can be lost at 900° C.

In this disclosure, the mass ratio of the magnesite and the sandstone is preferably 65~75:25~35, more preferably 70.6:29.4.

In this disclosure, the raw materials used are all preferably commercially available products if no special instructions.

This disclosure also provides a preparation method for the magnesium-based cementitious material, comprising the following steps:

Mixing the magnesite and sandstone to obtain a mixture, and processing the mixture by molding to obtain a molded raw meal;

Calcining the molded raw meal to obtain a clinker;

Mixing and shaping the clinker with water to obtain a primary cementitious material;

Subjecting the primary cementitious material to carbonization curing to obtain the magnesium-based cementitious material.

In this disclosure, magnesite and sandstone are mixed, and an obtained mixture is processed by molding to obtain a molded raw meal.

Before mixing, this disclosure preferably includes crushing and grinding the magnesite and the sandstone, respectively. The specific implementation of the crushing and grinding is not specifically limited in this disclosure, and operations well known to those skilled in the art can be used. In this disclosure, the median particle size of the magnesite is preferably less than 150 μm, more preferably less than 100 μm. In this disclosure, the median particle size of the sandstone is preferably less than 150 μm, more preferably less than 100 μm.

In this disclosure, the mass ratio of the magnesite to the sandstone is preferably 65-75:25-35, more preferably 70.6:29.4.

In this disclosure, the mixing is preferably mechanical stirring, which is not specifically limited in this disclosure, and the raw material can be uniformly mixed by using operations well known to those skilled in the art.

In this disclosure, the shaping process preferably includes granulation or pressing, more preferably granulation; in this disclosure, the granulation is preferably carried out in a counter-roll machine.

After obtaining the moulded raw meal, the moulded raw meal is calcined to obtain clinker.

In this disclosure, the calcination comprises a first calcination and a second calcination that are sequentially performed; wherein the temperature of the first calcination is 830~950° C., more preferably 850~900° C., the calcination time is 0.5~1h, more preferably 0.8~1 h; the temperature of the second calcination is 1120~1350° C., more preferably 1120~1250° C., the calcination time is 0.5~3 h, more preferably 1~2 h.

After the clinker is obtained, the clinker is mixed with water and molded to obtain the primary cementitious material.

In this disclosure, the forming comprises pressing or pouring. In this disclosure, when the forming is pressing, the mass ratio of the clinker to water is preferably 1:(0.10~0.25), more preferably 1:(0.13~0.18).

In this disclosure, when the molding is pouring, the mass ratio of the clinker and water is preferably 1:(0.30~0.40).

After the primary cementitious material is obtained, the primary cementitious material is subjected to carbonization curing to obtain the magnet-based cementitious material.

Before the carbonization curing, it is preferable to pre-curing the primary cementitious material.

In this disclosure, the pre-curing preferably comprises room temperature standard curing or carbonization pre-curing; in this disclosure, the temperature of the room temperature standard curing is preferably 18-22° C., and time of the room temperature standard curing is preferably 1 d. In this disclosure, the $CO_2$ concentration of the carbonization pre-curing is preferably 20-99%, more preferably 60-99%; the carbonization pre-curing time is preferably 1 hour; the carbonization pre-curing pressure is preferably normal pressure.

In this disclosure, the conditions of the carbonization curing are as follows: $CO_2$ concentration of 20~99%, more preferably of 60~99%; gas pressure of 0.1~0.4 MPa, more preferably of 0.1 to 0.3 MPa; relative humidity of 10~99%, more preferably of 40%~60%, temperature of −20~120° C., more preferably of 10~60° C., and carbonization curing time of 10 min~28 d, more preferably of, more preferably 2 h~7 d, most preferably 1 d~5 d.

FIG. 1 is the flow chart of the preparation process of magnesium-based cementitious material in this disclosure. As shown in FIG. 1, in this disclosure, mixing the magnesite and sandstone to obtain a mixture, and processing the mixture by molding to obtain a molded raw meal; calcining the molded raw meal to obtain a clinker; mixing and shaping the clinker with water to obtain a primary cementitious material; subjecting the primary cementitious material to carbonization curing to obtain the magnesium-based cementitious material.

This disclosure also provides an application of the magnesium-based cementitious material according to claim 1 in building materials.

The magnesium-based cementitious material provided by this disclosure and its preparation method and application are described in detail below in conjunction with the embodiments, but they should not be construed as limiting the protection scope of this disclosure.

Embodiment 1

The composition of the magnesite, the sandstone in the present embodiment is shown in Table 1.

TABLE 1

| Composition of magnesite and sandstone in Embodiment 1 | | | | | | |
|---|---|---|---|---|---|---|
| | loss on ignition (%) | CaO (%) | SiO$_2$ (%) | Al$_2$O$_3$ (%) | Fe$_2$O$_3$ (%) | MgO (%) |
| magnesite | 46.975 | 0.89 | 1.23 | 2.880 | 5.75 | 43.025 |
| sandstone | 6.381 | 5.366 | 74.887 | 8.142 | 3.406 | 1.223 |

The above-mentioned loss on ignition is water, carbon dioxide, and other gaseous components that can be lost at 900° C.

The magnesite and sandstone are crushed and ground to obtain magnesite with a median particle size of 100 μm and sandstone with a median particle size of 150 μm.

70.6 g of the ground magnesite and 29.4 g of sandstone are mixed uniformly, and an obtained mixture is granulated by a pair of rollers to obtain molded raw meal with a diameter of 20-30 mm.

The obtained molded raw meal is first calcined at a temperature of 850° C. for 1 h, then heated to 1350° C. and continued to be calcined for 1 h, then sequentially cooled (cooled to room temperature), and ground to obtain clinker. The particle size of the clinker D90 is less than 150 μm.

The obtained 10 g clinker powder and the water of 1.5 g are mixed, the gained admixture is poured into the mold, and compression molding is performed to obtain the primary cementitious material.

The obtained primary cementitious material is demolded after curing for 1 hour in an environment with a carbon dioxide concentration of 80%, atmospheric pressure at normal pressure, relative humidity of 80%, and a temperature of 25° C.

The obtained demoulding product is subjected to carbonization curing, and the curing conditions are: carbon dioxide concentration of 99%, gas pressure of 0.3 MPa, relative humidity of 50%, temperature of 25° C., and curing time of 1 d, to obtain a magnesium-based cementitious material.

Embodiment 2

The magnesite and the sandstone are crushed and ground to obtain magnesite with a median particle size of 100 μm and sandstone with a median particle size of 110 μm.

70.6 g of the ground magnesite and 29.4 g of sandstone are mixed uniformly, and an obtained mixture is granulated by a pair of rollers to obtain molded raw meal with a diameter of 20-30 mm.

The obtained molded raw meal is first calcined at a temperature of 850° C. for 1 h, then heated to 1200° C. and continued to be calcined for 1 h, then sequentially cooled (cooled to room temperature), and ground to obtain clinker. The particle size of the clinker D90 is less than 150 μm.

The obtained 10 g of clinker powder and 2.5 g of water are mixed, the obtained mixed material is poured into a mold, and pressed to form a primary cementitious material.

The obtained primary cementitious material is demolded after curing for 1 hour in an environment with a carbon dioxide concentration of 80%, atmospheric pressure at normal pressure, relative humidity of 80%, and a temperature of 25° C.

The obtained demoulding product is subjected to carbonization curing, and the curing conditions are: carbon dioxide concentration of 99%, gas pressure of 0.2 MPa, relative humidity of 80%, temperature of 25° C., and curing time of 1 d, to obtain a magnesium-based cementitious material.

Comparative Embodiment 1

The magnesite is calcined at 1000° C. to obtain MgO, and after mixing magnesium oxide and magnesium chloride in a mass ratio of 7:3, the obtained mixture and water are mixed in a water-to-powder ratio of 1:4 to obtain a mixture.

The obtained mixture is poured into a mold, cured in a standard oxygen environment at room temperature for 1 d, and then demolded, and then the product obtained from the demolding is placed in a standard oxygen environment at room temperature for 28 days to obtain a magnesium oxychloride cement product.

The main chemical components of magnesite and sandstone used in the embodiments and comparative embodiment of this disclosure are as follows: (LOI means loss on ignition, specifically the content of water and carbon dioxide):

| | LOI (%) | CaO (%) | SiO$_2$ (%) | Al$_2$O$_3$ (%) | Fe$_2$O$_3$ (%) | MgO (%) |
|---|---|---|---|---|---|---|
| magnesite | 46.975 | 0.89 | 1.23 | 2.880 | 5.75 | 43.025 |
| sandstone | 6.381 | 5.366 | 74.887 | 8.142 | 3.406 | 1.223 |

In this disclosure, the mechanical properties of Embodiments 1 and 2 and Comparative Embodiment 1 are tested. The mechanical property test method is as follows: pouring the mixture obtained by mixing the clinker and water into a cylindrical mold with an inner diameter of 20 mm, and extruding it through 30 MPa pressure to obtain a cylindrical molded product with a bottom diameter of 20 mm and a height of 20±0.1 mm. Then, using the displacement loading method (the loading rate is 0.5 mm/min), the compressive strength is tested by the MTS universal mechanical testing machine. The test results are shown in Table 2. It can be seen from Table 2 that the magnet-based cementitious material prepared by this disclosure has good compressive strength.

TABLE 2

Test results of compressive strength of cementitious material prepared in Embodiments 1 and 2 and Comparative Embodiment 1

| | Embodiment 1 | Embodiment 2 | Comparative Embodiment 1 |
|---|---|---|---|
| Compressive strength (MPa) | 110.23 | 90.75 | 51.60 |

In this disclosure, the water resistance test is also carried out on the cementitious materials prepared in Embodiment 1 and Comparative Embodiment 1, The test method is to soak the carbonized and cured samples of Embodiment 1 and Comparative Embodiment 1 in water for 7 d, and then test the compressive strength of the soaked samples. The test of compressive strength is as follows: the method of displacement loading (the loading rate is 0.5 mm/min) is used for testing with the MTS universal mechanical testing machine.

The test results are as follows: the compressive strength of the magnesium-based cementitious material prepared in Embodiment 1 is 93.59 MPa, and the compressive strength of the cementitious material prepared in Comparative Embodiment 1 is 22.19 MPa. From the test results, it can be concluded that the magnet-based cementitious material prepared by this disclosure has good water resistance.

In this disclosure, the corrosion properties of the magnesium-based cementitious materials prepared in Embodiments 1 and 2 and the cementitious materials prepared in Comparative Embodiment 1 to metals are also tested. The test method is: applying the anti-rust coating on the surface of the 100 mm*100 mm*5 mm iron plate, and then scraping off the anti-rust coating on the upper surface. The clinker obtained in Embodiment 1 is mixed with water and the mixed material obtained by the clinker obtained in Comparative Embodiment 1 is mixed with water and the mixed material is evenly smeared on the side of scraping off the anti-rust coating, respectively. Then, the maintenance is carried out according to the methods of Embodiment 1 and Comparative Embodiment 1 respectively. The iron plate after curing according to Embodiment 1 is recorded as Embodiment 1 iron plate, and the iron plate after curing according to Comparative Embodiment 1 is recorded as Comparative Embodiment 1 iron plate.

Figure 2:
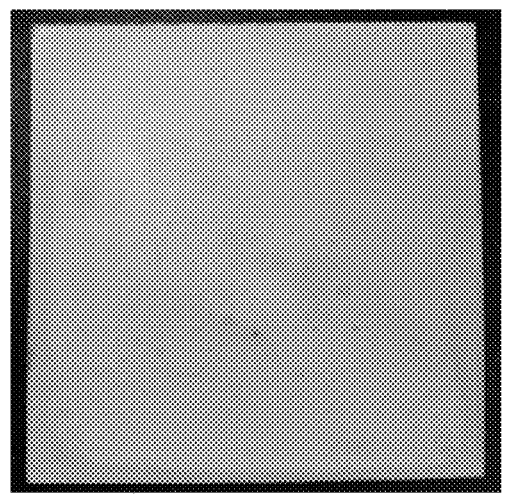
FIG. 2 is a figure of the corrosion performance test of Embodiment 1 iron plate.
Figure 3:
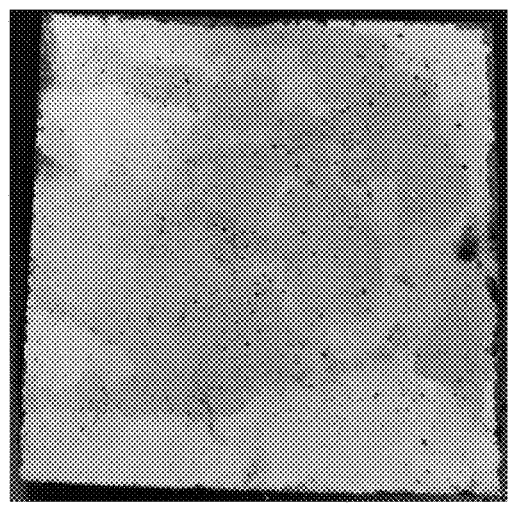
FIG. 3 is a figure of the corrosion performance test of Comparative Embodiment 1 iron plate.

FIG. 2 and FIG. 3 are respectively the results of the corrosion performance test of the Embodiment 1 iron plate and the Comparative Embodiment 1 iron plate.

It can be seen from FIG. 2 and FIG. 3 that there is no rust trace on the surface of the Embodiment 1 iron plate, and obvious rust appears on the surface of the Comparative Embodiment 1 iron plate.

It is to be understood, however, that even though numerous characteristics and advantages of this disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A preparation method for a magnesium-based cementitious material, comprising the following steps: mixing magnesite and sandstone to obtain a mixture, and processing the mixture by molding to obtain a molded raw meal; wherein the magnesite is provided with CaO, $SiO_2$, $Al_2O_3$, $Fe_2O_3$ and MgO, a mass percentage of the CaO is less than 5%, a mass percentage of $SiO_2$ is less than 5%, a mass percentage of $Al_2O_3$ is less than 5%, a mass percentage of $Fe_2O_3$ is less than 7%, a mass percentage of MgO is between 37% and 50%; the sandstone is provided with $SiO_2$, CaO, $Al_2O_3$, and $Fe_2O_3$, a mass percentage of $SiO_2$ is greater than 70%, a mass percentage of CaO is less than 10%, a mass percentage of $Al_2O_3$ is less than 10%, and a mass percentage of $Fe_2O_3$ is less than 5%; and a mass ratio of the magnesite to the sandstone is 65-75:25-35; calcining the molded raw meal to obtain a clinker; mixing and shaping the clinker with water to obtain a primary cementitious material; subjecting the primary cementitious material to carbonization curing to obtain the magnesium-based cementitious material.

2. The preparation method for the magnesium-based cementitious material according to claim 1, the calcination comprises a first calcination and a second calcination that are sequentially performed; wherein the temperature of the first calcination is at a range of 830~950° C. with a calcination time of 0.5-1 h; the temperature of the second calcination is at a range of 1120~1350° C.

3. The preparation method for the magnesium-based cementitious material according to claim 1, wherein the mass ratio of the clinker and water is 1:(0.1~0.4).

4. The preparation method for the magnesium-based cementitious material according to claim 1, wherein the molding comprises pressing or casting.

5. The preparation method for the magnesium-based cementitious material according to claim 1, wherein the conditions of the carbonization curing are as follows: $CO_2$ concentration of 20~99%, gas pressure of 0.1-0.4 MPa, relative humidity of 10~99%, temperature of −20~120° C., and carbonization curing time of 10 minutes to 28 days.

6. The preparation method for the magnesium-based cementitious material according to claim 1, wherein in the magnesite, the mass percentage of CaO is 0.89%, the mass percentage of $SiO_2$ is 1.23%, the mass percentage of $Al_2O_3$ is 2.880%, the mass percentage of $Fe_2O_3$ is 5.75%, and the mass of MgO is 43.025%.

7. The preparation method for the magnesium-based cementitious material according to claim 1, wherein in the sandstone, the mass percentage of $SiO_2$ is 74.887%, the mass percentage of CaO is 5.366%, the mass percentage of $Al_2O_3$ is 8.142%, the mass percentage of $Fe_2O_3$ is 3.406%, and the mass percentage of MgO is 1.223%.

* * * * *